(12) United States Patent  
Iguchi

(10) Patent No.: US 9,631,727 B1  
(45) Date of Patent: Apr. 25, 2017

(54) MECHANICAL SEAL

(71) Applicant: EAGLE INDUSTRY CO., LTD., Tokyo (JP)

(72) Inventor: Tetsuya Iguchi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/316,894

(22) PCT Filed: Jun. 2, 2015

(86) PCT No.: PCT/JP2015/065886  
§ 371 (c)(1),  
(2) Date: Dec. 7, 2016

(87) PCT Pub. No.: WO2015/190350  
PCT Pub. Date: Dec. 17, 2015

(30) Foreign Application Priority Data

Jun. 13, 2014 (JP) .................. 2014-122166

(51) Int. Cl.  
*F16J 15/34* (2006.01)  
*F16J 15/36* (2006.01)

(52) U.S. Cl.  
CPC ........... *F16J 15/3448* (2013.01); *F16J 15/36* (2013.01)

(58) Field of Classification Search  
CPC ...... F16J 15/34; F16J 15/3436; F16J 15/3448; F16J 15/3452; F16J 15/346; F16J 15/36  
See application file for complete search history.

(56) References Cited

U.S. PATENT DOCUMENTS 9,394,799 B1 *  7/2016  Mills .................. F16J 15/34  
2016/0003362 A1 *  1/2016  Suefuji ............... F16J 15/348  
277/377

FOREIGN PATENT DOCUMENTS

FR      1237156 A1  7/1960  
JP      S42-000605 B1  1/1967  
JP      S61-099764 U  6/1986

* cited by examiner

*Primary Examiner* — Gilbert Lee  
(74) *Attorney, Agent, or Firm* — Harness, Dickey & Pierce, P.L.C.

(57) ABSTRACT

A mechanical seal (100) is configured such that an annular sealed space (S1) is formed by a first bellows (141), a second bellows (151), and members respectively provided on both end sides of the first bellows (141) and the second bellows (151), and that the first bellows (141) and the second bellows (151) expand and contract in a central axial direction of a rotating shaft (200) in accordance with fluid pressure inside the sealed space (S1). The first bellows (141) and the second bellows (151) are arranged at positions distant to each other in the central axial direction, and are arranged such that a part of the first bellows (141) on a radially inward side and a part of the second bellows (151) on a radially outward side overlap when viewed in the central axial direction.

5 Claims, 2 Drawing Sheets

MECHANICAL SEAL

CROSS-REFERENCE TO RELATED APPLICATIONS

Figure 1:
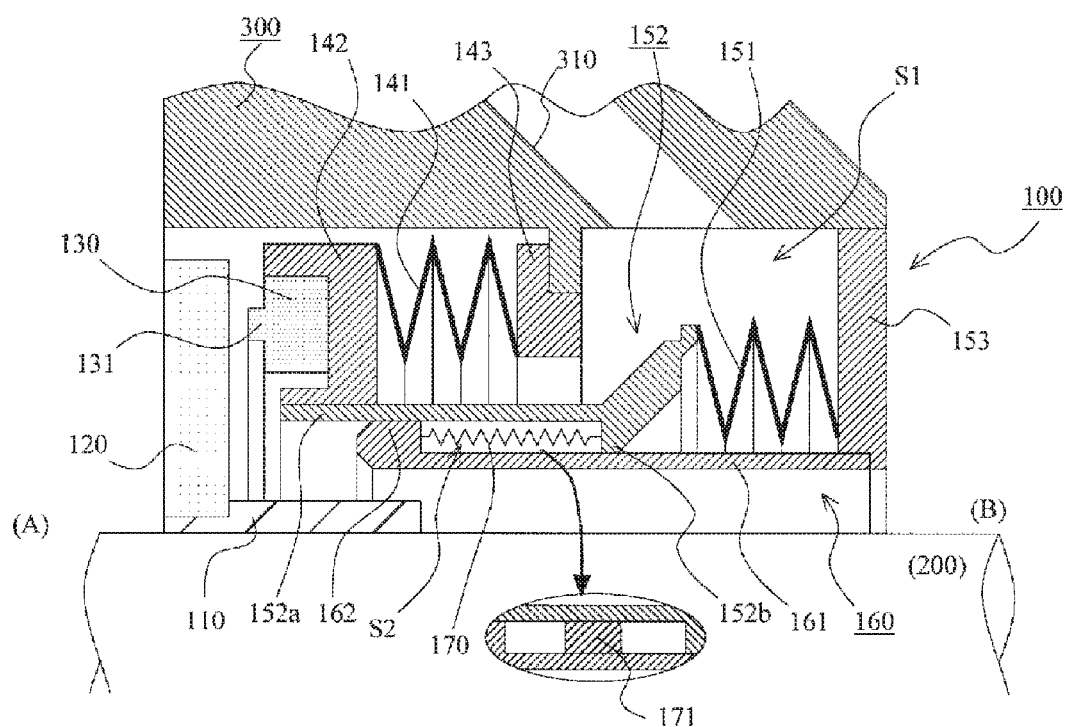

This application is a National Stage of International Application No. PCT/JP2015/065886, filed Jun. 2, 2015 (now WO 2015/190350A1), which is based on Japanese Application No. 2014-122166, filed Jun. 13, 2014. The entire disclosures of each of the above applications are incorporated herein by reference.

FIELD

The present disclosure relates to a mechanical seal.

BACKGROUND

A stationary-type mechanical seal is provided with a pressing mechanism which presses a stationary ring toward a rotating ring. As the pressing mechanism, a technique is known which is configured such that, by respectively providing bellows on an radially outward side and on a radially inward side, an annular sealed space is formed and the bellows are expanded and contracted by controlling fluid pressure inside the sealed space (refer to Patent Literature 1). In a mechanical seal including the pressing mechanism according to this conventional example, bellows are doubly provided on the radially outward side and on the radially inward side. In this case, since a minimum inside diameter on an inner circumferential side of the outer bellows must be set larger than a maximum outside diameter on an outer circumferential side of the inner bellows, a size of the mechanical seal increases in a radial direction.

CITATION LIST

Patent Literature

Patent Literature 1: Japanese Utility Model Application Laid-open No. S61-99764

SUMMARY

Technical Problem

An object of the present disclosure is to provide a mechanical seal, in which a pressing mechanism configured such that two bellows expand and contract in accordance with fluid pressure inside an annular sealed space that is formed by the two bellows is included, that enables downsizing in a radial direction.

Solution to Problem

In order to solve the problem described above, the present disclosure adopts the following means.

Specifically, a mechanical seal according to the present disclosure is a mechanical seal including: a rotating ring fixed with respect to a rotating shaft; a stationary ring which is fixed with respect to a housing including a shaft hole into which the rotating shaft is inserted and which slides on the rotating ring; and a pressing mechanism which presses the stationary ring toward the rotating ring, the pressing mechanism includes: a first bellows provided on a radially outward side; and a second bellows provided on a radially inward side, wherein the mechanical seal is configured such that an annular sealed space is formed by the first bellows, the second bellows, and members respectively provided on both end sides of the first bellows and the second bellows, and that the first bellows and the second bellows expand and contract in a central axial direction of the rotating shaft in accordance with fluid pressure inside the sealed space, and the first bellows and the second bellows are arranged at positions distant to each other in the central axial direction, and are arranged such that a part of the first bellows on a radially inward side and a part of the second bellows on a radially outward side overlap when viewed in the central axial direction.

According to the present disclosure, a minimum inside diameter on an inner circumferential side of the first bellows is smaller than a maximum outside diameter on an outer circumferential side of the second bellows. Therefore, compared to a mechanical seal provided with a pressing mechanism in which bellows are doubly provided on a radially outward side and on a radially inward side, downsizing in the radial direction can be achieved.

Preferably, a damping member which suppresses vibration of the pressing mechanism is provided on the radially inward side of the first bellows.

By providing the damping member as described above, vibration of the pressing mechanism is suppressed and an effect of disturbance can be reduced. In addition, since the damping member may be provided in a dead space created on a radially inward side of the first bellows, the damping member does not inhibit downsizing in the radial direction.

Preferably, a first retainer and a second retainer which fix the first bellows may be respectively provided on one end side and another end side of the first bellows, a third retainer and a fourth retainer which fix the second bellows may be respectively provided on one end side and another end side of the second bellows, the third retainer may be configured to extend to a radially inward side of the first bellows, and a cylindrical member fixed to the fourth retainer may be provided on a radially inward side of the third retainer, and an annular gap may be provided between the third retainer and the cylindrical member and the damping member may be provided in the annular gap.

In this case, favorably, the damping member may be a coil spring which is arranged so that a spring force is applied in a direction that causes the first bellows and the second bellows to contract.

Accordingly, control for causing the first bellows and the second bellows to expand and contract can be performed by cooperation between fluid pressure inside the sealed space and the coil spring.

Preferably, the damping member may be an elastic body ring which is in slidable close contact with each of an inner circumferential surface of the third retainer and an outer circumferential surface of the cylindrical member.

In this case, a function of sealing the annular gap between the inner circumferential surface of the third retainer and the outer circumferential surface of the cylindrical member can be exhibited by the elastic body ring.

Moreover, the respective configurations described above can be adopted in combination with each other as applicable as possible.

Advantageous Effects of the Disclosure

As described above, according to the present disclosure, in a mechanical seal including a pressing mechanism configured such that two bellows expand and contract in accordance with fluid pressure inside an annular sealed space that is formed by the two bellows, downsizing can be achieved in a radial direction.

DRAWINGS

Figure 2:
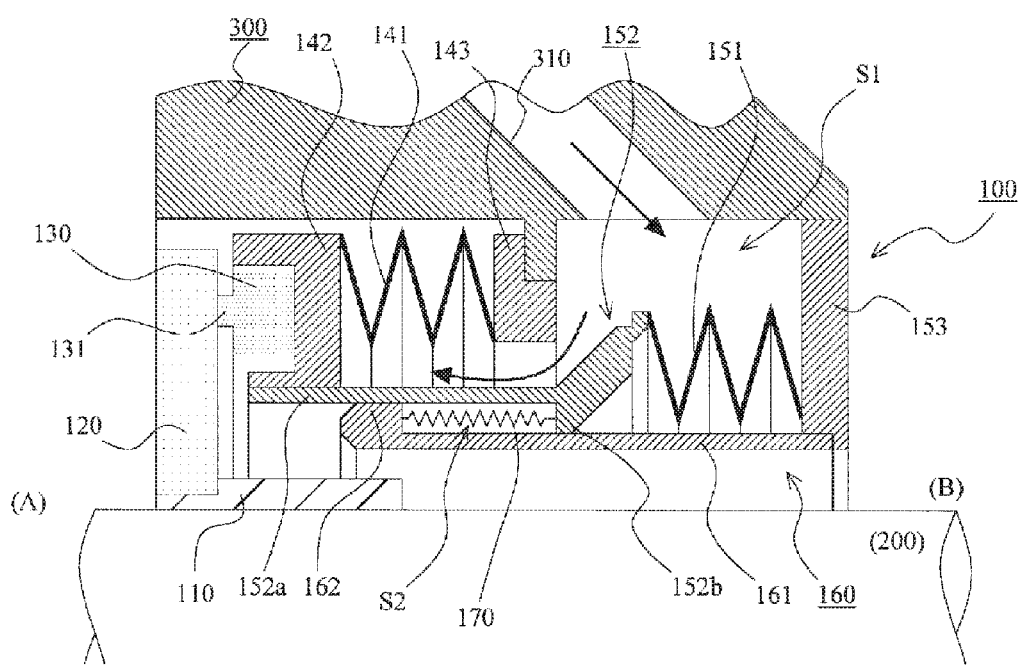

FIG. 1 is a schematic sectional view of a mechanical seal according to an Example of the present disclosure; and FIG. 2 is a schematic sectional view of a mechanical seal according to an Example of the present disclosure.

DETAILED DESCRIPTION

Hereinafter, modes for implementing the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

Example

<Mechanical Seal>

A configuration of a mechanical seal according to an Example of the present disclosure will be described with reference to FIGS. 1 and 2. A mechanical seal 100 according to the present Example serves a purpose for sealing an annular gap between a rotating shaft 200 and a shaft hole provided on a housing 300 (a shaft hole into which the rotating shaft 200 is inserted). In addition, the mechanical seal 100 includes a sleeve 110 which is fixed to the rotating shaft 200, a rotating ring 120 which is fixed with respect to the rotating shaft 200 via the sleeve 110, and a stationary ring 130 which is fixed with respect to the housing 300 via a plurality of members. Moreover, the sealing function of the mechanical seal 100 is exhibited when an annular projection 131 at a tip of the stationary ring 130 slides while being in surface contact with the rotating ring 120 during rotation of the rotating shaft 200. Furthermore, in the present Example, in FIGS. 1 and 2, a left side is an inboard side (A) and a right side is an outboard side (B), and a fluid to be sealed on the inboard side (A) is prevented from leaking to the outboard side (B) by the mechanical seal 100.

In addition, the mechanical seal 100 is provided with a pressing mechanism which presses the stationary ring 130 toward the rotating ring 120. The pressing mechanism includes a first bellows 141 provided on a radially outward side and a second bellows 151 provided on a radially inward side. A first retainer 142 is provided on one end side (the inboard side (A)) of the first bellows 141, and a second retainer 143 is provided on another end side (the outboard side (B)) of the first bellows 141. The first bellows 141 is fixed by the first retainer 142 and the second retainer 143. In addition, the stationary ring 130 is fixed to the first retainer 142. The second retainer 143 is fixed to the housing 300.

A third retainer 152 is provided on one end side (the inboard side (A)) of the second bellows 151, and a fourth retainer 153 is provided on another end side (the outboard side (B)) of the second bellows 151. The second bellows 151 is fixed by the third retainer 152 and the fourth retainer 153. In addition, the third retainer 152 includes a cylinder portion 152a and an annular projection 152b which extends toward a radially inward side on another end side of the cylinder portion 152a. As illustrated, the cylinder portion 152a of the third retainer 152 provided on one end side of the second bellows 151 is configured to extend to a radially inward side of the first bellows 141. Furthermore, one end side of the cylinder portion 152a is fixed to an inner circumferential surface of the first retainer 142. Moreover, the fourth retainer 153 is fixed to the housing 300.

In addition, an annular sealed space S1 is formed by the first bellows 141, the first retainer 142 and the second retainer 143 provided on both sides of the first bellows 141, the second bellows 151, and the third retainer 152 and the fourth retainer 153 provided on both sides of the second bellows 151. The first bellows 141 and the second bellows 151 are configured to expand and contract in a central axial direction of the rotating shaft 200 in accordance with fluid pressure of a fluid such as gas that is supplied to the sealed space S1 from a passage 310 provided in the housing 300. Hereinafter, the central axial direction of the rotating shaft 200 will be simply referred to as a "central axial direction". Due to the pressing mechanism configured as described above, by controlling fluid pressure inside the sealed space S1, the first bellows 141 and the second bellows 151 can be expanded and contracted. In addition, since the sealed space S1 exhibits functions of a damper, vibration of the pressing mechanism can be suppressed.

In the present Example, the stationary ring 130 is separated from the rotating ring 120 as shown in FIG. 1 when a fluid is not supplied to the sealed space S1. When a fluid is supplied to the sealed space S1 and fluid pressure inside the sealed space S1 increases, a state is created where the stationary ring 130 is in close contact with the rotating ring 120 as shown in FIG. 2.

In addition, a cylindrical member 160 which is fixed to the fourth retainer 153 is provided on a radially inward side of the third retainer 152. The cylindrical member 160 includes a cylinder portion 161 and an annular projection 162 which extends toward a radially outward side at one end side of the cylinder portion 161. Furthermore, the other end side of the cylinder portion 161 is fixed to the fourth retainer 153.

In addition, a configuration is adopted in which an outer circumferential surface of the annular projection 162 provided on the cylindrical member 160 comes into slidable contact with an inner circumferential surface of the cylinder portion 152a of the third retainer 152. Furthermore, a configuration is adopted in which an inner circumferential surface of the annular projection 152b of the third retainer 152 comes into slidable contact with an outer circumferential surface of the cylinder portion 161 of the cylindrical member 160. According to the configurations described above, an annular gap S2 with a rectangular section is formed between the third retainer 152 and the cylindrical member 160. In addition, when the first bellows 141 and the second bellows 151 expand and contract, the third retainer 152 reciprocates so that sliding movements respectively occur between the outer circumferential surface of the annular projection 162 and the inner circumferential surface of the cylinder portion 152a and between the inner circumferential surface of the annular projection 152b and the outer circumferential surface of the cylinder portion 161. In this manner, the pressing mechanism is positioned in a stable manner with respect to the radial direction by the cylindrical member 160. Moreover, as described above, the pressing mechanism is mainly constituted by the first bellows 141, the first retainer 142, the second retainer 143, the second bellows 151, the third retainer 152, and the fourth retainer 153.

In addition, the annular gap S2 described above is provided with a coil spring 170 as a damping member. The coil spring 170 is arranged such that one end side thereof is in close contact with the annular projection 162 and another end side thereof is in close contact with the annular projection 152b so that a spring force is applied in a direction that causes the first bellows 141 and the second bellows 151 to contract.

<Arrangement Configuration of First Bellows and Second Bellows>

An arrangement configuration of the first bellows 141 and the second bellows 151 will be described in further detail. The first bellows 141 and the second bellows 151 are arranged at positions distant to each other in the central axial direction. In addition, the first bellows 141 and the second bellows 151 are arranged so that, when viewed in the central axial direction, a part of the first bellows 141 on a radially inward side and a part of the second bellows 151 on a radially outward side overlap. In other words, a minimum inside diameter on an inner circumferential side of the first bellows 141 is set smaller than a maximum outside diameter on an outer circumferential side of the second bellows 151. It is needless to say that the minimum inside diameter on the inner circumferential side of the first bellows 141 is set larger than a minimum inside diameter on an inner circumferential side of the second bellows 151.

<Advantages of Mechanical Seal According to Present Example>

With the mechanical seal 100 according to the present Example configured as described above, the first bellows 141 and the second bellows 151 are arranged at positions distant to each other in the central axial direction, and are arranged such that a part of the first bellows 141 on a radially inward side and a part of the second bellows 151 on a radially outward side overlap when viewed in the central axial direction. In other words, a minimum inside diameter on an inner circumferential side of the first bellows 141 is smaller than a maximum outside diameter on an outer circumferential side of the second bellows 151. Therefore, compared to a mechanical seal provided with a pressing mechanism in which bellows are doubly provided on a radially outward side and on a radially inward side, downsizing in the radial direction can be achieved.

In addition, with the mechanical seal 100 according to the present Example, the coil spring 170 as a damping member which suppresses vibration of the pressing mechanism is provided in the annular gap S2 provided on a radially inward side of the first bellows 141. Accordingly, vibration of the pressing mechanism can be further suppressed and an effect of disturbance can be reduced.

As described above, the minimum inside diameter on the inner circumferential side of the first bellows 141 is set larger than the minimum inside diameter on the inner circumferential side of the second bellows 151. In addition, the first bellows 141 and the second bellows 151 are arranged at positions distant to each other in the central axial direction. As a result, a dead space is formed on the radially inward side of the first bellows 141. The annular gap S2 described above is to be provided in this dead space. Therefore, providing the coil spring 170 that is a damping member does not inhibit downsizing in the radial direction.

In addition, the present Example adopts the coil spring 170 which is arranged so that a spring force is applied in a direction that causes the first bellows 141 and the second bellows 151 to contract as a damping member. Accordingly, control for causing the first bellows 141 and the second bellows 151 to expand and contract can be performed by cooperation between fluid pressure inside the sealed space S1 and the coil spring 170. In particular, when fluid pressure inside the sealed space S1 is reduced, the stationary ring 130 can be more reliably separated from the rotating ring 120 by the coil spring 170.

Moreover, as shown in a circled portion in FIG. 1, an elastic body ring 171 which is in slidable close contact with each of an inner circumferential surface of the third retainer 152 (the cylinder portion 152a) and an outer circumferential surface of the cylindrical member 160 (the cylinder portion 161) can be adopted as the damping member instead of a coil spring. When adopting this configuration, a function of sealing the annular gap between the inner circumferential surface of the third retainer 152 and the outer circumferential surface of the cylindrical member 160 can be exhibited by the elastic body ring 171.

REFERENCE SIGNS LIST 100 mechanical seal
110 sleeve
120 rotating ring
130 stationary ring
131 annular projection
141 first bellows
142 first retainer
143 second retainer
151 second bellows
152 third retainer
152a cylinder portion
152b annular projection
153 fourth retainer
160 cylindrical member
161 cylinder portion
162 annular projection
170 coil spring
171 elastic body ring
200 rotating shaft
300 housing
310 passage
S1 sealed space
S2 annular gap

The invention claimed is:

1. A mechanical seal comprising:
a rotating ring fixed with respect to a rotating shaft;
a stationary ring which is fixed with respect to a housing including a shaft hole into which the rotating shaft is inserted and which slides on the rotating ring; and
a pressing mechanism which presses the stationary ring toward the rotating ring, the pressing mechanism includes:
a first bellows provided on a radially outward side; and
a second bellows provided on a radially inward side,
wherein the mechanical seal is configured such that an annular sealed space is formed by the first bellows, the second bellows, and members respectively provided on both end sides of the first bellows and the second bellows, and that the first bellows and the second bellows expand and contract in a central axial direction of the rotating shaft in accordance with fluid pressure inside the sealed space, and
the first bellows and the second bellows are arranged at positions distant to each other in the central axial direction, and are arranged such that a part of the first bellows on a radially inward side and a part of the second bellows on a radially outward side overlap when viewed in the central axial direction.

2. The mechanical seal according to claim 1, wherein a damping member which suppresses vibration of the pressing mechanism is provided on the radially inward side of the first bellows.

3. The mechanical seal according to claim 2, wherein a first retainer and a second retainer which fix the first bellows are respectively provided on one end side and another end side of the first bellows,
- a third retainer and a fourth retainer which fix the second bellows are respectively provided on one end side and another end side of the second bellows,
- the third retainer is configured to extend to a radially inward side of the first bellows, and a cylindrical member fixed to the fourth retainer is provided on a radially inward side of the third retainer, and
- an annular gap is provided between the third retainer and the cylindrical member and the damping member is provided in the annular gap.

4. The mechanical seal according to claim 3, wherein the damping member is a coil spring which is arranged so that a spring force is applied in a direction that causes the first bellows and the second bellows to contract.

5. The mechanical seal according to claim 3, wherein the damping member is an elastic body ring which is in slidable close contact with each of an inner circumferential surface of the third retainer and an outer circumferential surface of the cylindrical member.

* * * * *